(12) United States Patent
Takeda (10) Patent No.: US 8,352,751 B2
(45) Date of Patent: Jan. 8, 2013

(54) ENCRYPTION PROGRAM OPERATION MANAGEMENT SYSTEM AND PROGRAM

(75) Inventor: Jun Takeda, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/096,726

(22) Filed: Apr. 28, 2011

(65) Prior Publication Data

US 2011/0219241 A1 Sep. 8, 2011

Related U.S. Application Data

(63) Continuation of application No. 12/610,139, filed on Oct. 30, 2009, now abandoned.

(30) Foreign Application Priority Data

Dec. 25, 2008 (JP) ................................. 2008-330847

(51) Int. Cl.
G06F 11/30 (2006.01)
(52) U.S. Cl. ...................................................... 713/193
(58) Field of Classification Search ................... 713/193
See application file for complete search history.

(56) References Cited

U.S. PATENT DOCUMENTS

| | | | | |
|---|---|---|---|---|
| 2002/0002468 A1* | 1/2002 | Spagna et al. | ................. | 705/1 |
| 2003/0016827 A1 | 1/2003 | Asano et al. | | |
| 2008/0292104 A1 | 11/2008 | Loc'H et al. | | |

FOREIGN PATENT DOCUMENTS

| | | |
|---|---|---|
| JP | 09-319573 | 12/1997 |
| JP | 11-027253 | 1/1999 |
| JP | 11-308213 | 11/1999 |
| JP | 2000-115551 | 4/2000 |
| JP | 2000-358022 | 12/2000 |
| JP | 2001-036518 | 2/2001 |
| JP | 2002-290396 | 10/2002 |
| JP | 2002-314527 | 10/2002 |
| JP | 2003-143131 | 5/2003 |
| JP | 2005-260286 | 9/2005 |
| JP | 2006-229279 | 8/2006 |

(Continued)

OTHER PUBLICATIONS

Notice of Reasons for Rejection mailed by Japan Patent Office on Dec. 15, 2009 in the corresponding Japanese Patent Application No. 2008-330847.

(Continued)

*Primary Examiner* — Cordelia Zecher
(74) *Attorney, Agent, or Firm* — Knobbe, Martens, Olson and Bear, LLP (57) ABSTRACT

According to one embodiment, an encryption program operation management system includes an encryption key table creation module which creates encryption keys and creates an encryption key table including encrypted versions of the encryption keys and items of plaintext index information for recognizing the encryption keys, and an installation package creation module which creates an installation package including an encryption program, the encryption key table, and an installation program for installing the encryption program into a computer. The installation program causes the computer to carry out an operation of selecting one of the encrypted versions of encryption keys and an operation of creating and storing encryption key information including the selected one of the encrypted versions of encryption key and one of the items of plaintext index information associated with the selected one of the encrypted versions of encryption keys.

6 Claims, 5 Drawing Sheets

FOREIGN PATENT DOCUMENTS

| | | |
|---|---|---|
| JP | 2006-319861 A | 11/2006 |
| JP | 2007-280198 | 10/2007 |
| JP | 2008-165486 | 7/2008 |
| JP | 2008-278469 | 11/2008 |
| JP | 2006-319861 | 11/2009 |
| WO | WO 02/087146 A1 | 10/2002 |
| WO | WO 2005/099168 A1 | 10/2005 |
| WO | WO 2006/040806 A1 | 4/2006 |

OTHER PUBLICATIONS

Explanation of Non-English Language References.

* cited by examiner

ENCRYPTION PROGRAM OPERATION MANAGEMENT SYSTEM AND PROGRAM

CROSS-REFERENCE TO RELATED APPLICATIONS

This application is a continuation of U.S. patent application Ser. No. 12/610,139, filed on Oct. 30, 2009 and entitled "ENCRYPTION PROGRAM OPERATION MANAGEMENT SYSTEM AND PROGRAM," which is based upon and claims the benefit of priority from Japanese Patent Application No. 2008-330847, filed Dec. 25, 2008, the entire contents of both of which are incorporated herein by reference.

BACKGROUND

1. Field

One embodiment of the invention relates to the technique for managing an encryption key in a case where hard disk encryption software is distributed and installed to prevent important data from being leaked from a computer which, for example, an employee uses in doing work.

2. Description of the Related Art

In recent years, many of the office operations have been performed using personal computers, including desktop and notebook computers. Since the notebook computer can be powered by the battery, the user can carry it with him or her whenever going out and work in the car on the road or at an outside location. Thus, the notebook computers are very convenient.

Meanwhile, data leakage due to theft has been regarded as a problem. In this connection, the use of hard disk encryption software for encrypting the data in the hard disk has begun to spread. Hard disk encryption software is a data encryption program which encrypts data using an encryption key in writing data into the hard disk and decrypts the encrypted data in reading the data from the hard disk. When the hard disk encryption software is distributed to the employees to cause them to install it into the individual computers, this is achieved by either the on-line installation method or the off-line installation method.

In the on-line installation method, the client side sets an encryption key arbitrarily and informs the operation management server on the management side of the encryption key. In the off-line installation method, the management side sets an encryption key respectively in creating an installation package for installing hard disk encryption software and distributes the encryption key to the client in a top-down method.

That is, in the on-line installation method, the administrator manages the encryption key reported by the client. In the off-line installation method, the administrator manages the self-set encryption key in creating an installation package to be distributed to the clients. The encryption key managed by the administrator is used for a so-called recovery process to extract encrypted data in the hard disk and decrypt the extracted data when the computer of a client cannot be activated, for example. Various methods of managing encryption keys have been proposed (e.g., refer to Jpn. Pat. Appln. KOKAI Publication No. 2006-319861).

In the on-line installation method, although each client may set an encryption key arbitrarily, enhancing security, a network environment and an operation management server are needed, making the size of the system larger. This leads to a disadvantage in that a certain amount of cost rise cannot be avoided.

In the off-line installation method, while the computer with which the administrator creates the installation package and the computer in which each client installs hard disk encryption software using the installation package are each allowed to operate on a stand-alone environment, achieving low operating cost, this approach has the following disadvantage: since the encryption keys of the clients who have installed hard disk encryption software using the same installation package are all the same, the strength of security is decreased.

SUMMARY

In some embodiments, an encryption program operation management system comprises: a processing device configured to implement an encryption key table generator, the encryption key table generator configured to generate encryption keys and to generate an encryption key table comprising encrypted versions of the encryption keys and items of plaintext index information, the encrypted versions of the encryption keys being associated with the items of index information, the encryption key table generator being configured to encrypt the generated encryption keys by using a first encryption key shared by an administrator managing an encryption program and a client using a computer upon which the encryption program is to be installed, wherein the processing device is further configured to implement an installation package generator configured to generate an installation package for distribution, the installation package comprising the encryption program, the encryption key table, and an installation program configured to cause the computer to install the encryption program on the computer; wherein the installation program is configured to cause the computer to select one of the encrypted versions of encryption keys in the encryption key table contained in the installation package used by the encryption program, and to generate and store an encryption key file comprising the selected one of the encrypted versions of encryption keys and one of the items of index information associated with the selected one of the encrypted versions of encryption keys when the installation program installs the encryption program on the computer, the installation program being configured to decrypt the selected one of the encrypted versions of encryption keys by using the first encryption key at the time of retrieving it from the encryption key table and to re-encrypt the selected one of the encrypted versions of encryption keys by using a second encryption key at the time of storing it in the encryption key file, the second encryption key being uniquely created by the client, the encryption key file being used for determination of the selected one of the encrypted versions of encryption keys, which is encrypted by using the second encryption key uniquely created by the client, by the administrator.

In some embodiments, a computer-readable non-transitory storage medium comprises a program configured to cause a computer of an administrator that manages an encryption program that is to be distributed and installed to: generate encryption keys and an encryption key table comprising encrypted versions of the encryption keys and items of plaintext index information, such that the encrypted versions of the encryption keys are associated with the items of index information, the generated encryption keys being encrypted by using a first encryption key shared by the administrator and a client using a computer upon which the encryption program is to be installed; and generate an installation package for distribution, the installation package comprising the encryption program, the encryption key table, and an installation program configured to cause the computer of the client to install the encryption program on the computer of the client, wherein the installation program is configured to cause the computer of the client to select one of the encrypted versions of encryption keys in the encryption key table contained in the installation package used by the encryption program, and to generate and store an encryption key file comprising the selected one of the encrypted versions of encryption keys and one of the items of index information associated with the selected one of the encrypted versions of encryption keys, when the installation program installs the encryption program on the computer of the client, the installation program being configured to decrypt the selected one of the encrypted versions of encryption keys by using the first encryption key at the time of retrieving it from the encryption key table and to re-encrypt the selected one of the encrypted versions of encryption keys by using a second encryption key at the time of storing it in the encryption key file, the second encryption key being uniquely created by the client.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an encryption program operation management system includes an encryption key table creation module which creates encryption keys and creates an encryption key table including encrypted versions of the encryption keys and items of plaintext index information for recognizing the encryption keys, and an installation package creation module which creates an installation package including an encryption program, the encryption key table, and an installation program for installing the encryption program into a computer. The installation program causes the computer to carry out an operation of selecting one of the encrypted version of encryption keys and an operation of creating and storing encryption key information including the selected one of the encrypted version of encryption key and one of the items of plaintext index information associated with the selected one of the encrypted version of encryption keys.

Figure 1:
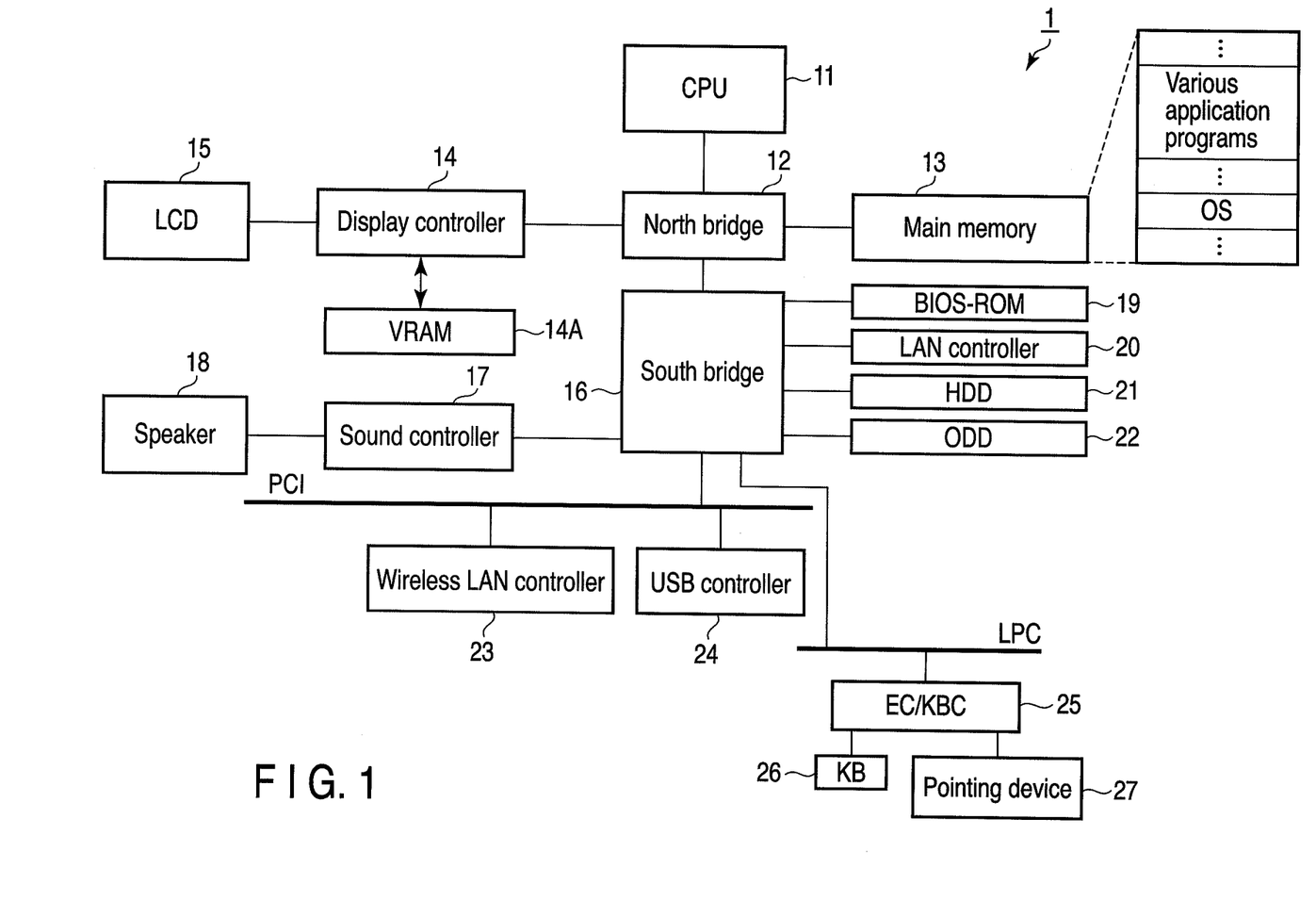
FIG. 1 is an exemplary diagram showing a system configuration of a personal computer used in an encryption program operation management system according to an embodiment of the invention.

FIG. 1 is an exemplary diagram showing a system configuration of a personal computer used in an encryption program operation management system according to an embodiment of the invention. The encryption program operation management system of the embodiment, which is for encrypting the data in the hard disk drive (HDD) of a personal computer given to each employee (or client) in an office or the like, is constructed of a personal computer for an administrator and a plurality of personal computers for clients.

Suppose the personal computer of the administrator and the personal computers for the clients are notebook personal computers of the same type which have the system configuration of FIG. 1. Although the embodiment will be explained using a system for encrypting the data in the HDD as an example, the invention is not limited to this. The invention may be applied to any system, provided that the system uses an encryption key for encrypting data.

As shown in FIG. 1, the computer includes a CPU 11, a north bridge 12, a main memory 13, a display controller 14, a video memory (VRAM) 14A, a liquid-crystal display (LCD) 15, a south bridge 16, a sound controller 17, a speaker 18, a BIOS-ROM 19, a LAN controller 20, a hard disk drive (HDD) 21, an optical disc drive (ODD) 22, a wireless LAN controller 23, a USB controller 24, an embedded controller/keyboard controller (EC/KBC) 25, a keyboard (KB) 26, and a pointing device 27.

The CPU 11 is a processor for controlling the operation of the computer, and executes an operating system (OS) and various application programs that operate under the control of the OS loaded from the HDD 21 or ODD 22 into the main memory 13. Moreover, the CPU 11 executes a basic input/output system (BIOS) stored in the BIOS-ROM 19. The BIOS is a program for controlling hardware.

The north bridge 12 is a bridge device which connects the local bus of the CPU 11 and the south bridge 16. The north bridge 12 includes a memory controller which provides access control of the main memory 13. The north bridge 12 also includes the function of communicating with the display controller 14.

The display controller 14 is a device which controls the LCD 15 used as a display monitor of the computer. The display controller 14 generates a display signal and sends the signal to the LCD 15.

The south bridge 16 controls the individual devices on a peripheral component interconnect (PCI) bus and a low pin count (LPC) bus. The south bridge 16 includes an integrated drive electronics (IDE) controller for controlling the HDD 21 and ODD 22 and a memory controller for providing access control of the BIOS-ROM 19. The south bridge 16 also includes the function of communicating with the sound controller 17 and LAN controller 20.

The sound controller 17 is a sound source device, and outputs audio data to be reproduced to the speaker 18.

The LAN controller 20 is a wire communication device which performs wire communication complying with, for example, the Ethernet (registered trademark) standard. The wireless LAN controller 23 is a wireless communication device which performs wireless communication conforming to, for example, the IEEE 802.11 standard. The USB controller 24 controls an USB device externally connected via, for example, a cable complying with the USB 2.0 standard.

The EC/KBC 25 is a one-chip microcomputer in which an embedded controller for power management and a keyboard controller for controlling the KB 26 and pointing device 27 are integrated. The EC/KBC 25 includes the function of providing on/off control of the power of the computer according to the user operation.

Figure 2:
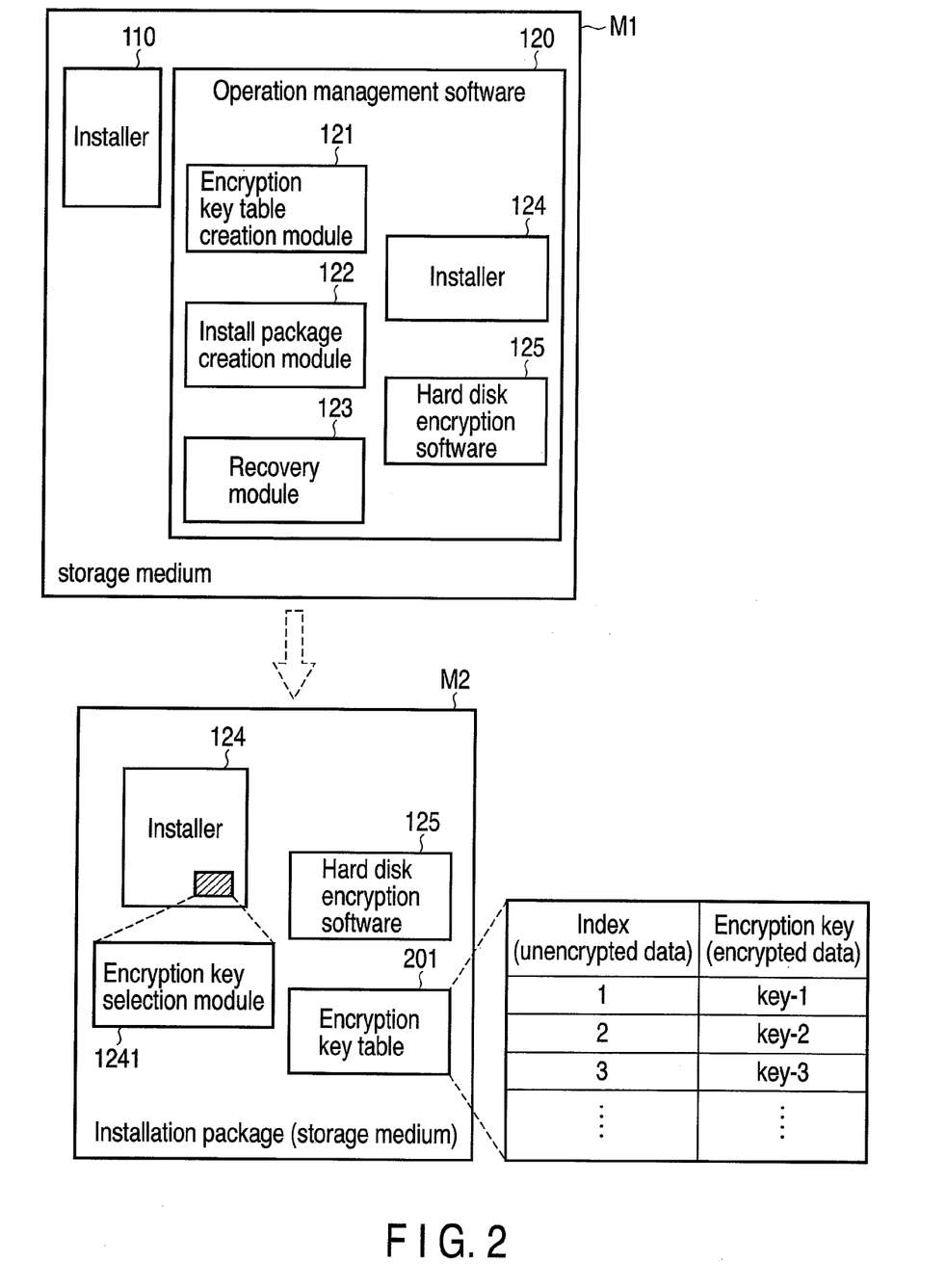
FIG. 2 is an exemplary conceptual diagram to explain the way an installation package is created in the encryption program operation management system of the embodiment.

When an encryption program operation management system is constructed using the computers configured as described above, the administrator installs operation management software 120 into his or her own computer using a storage medium M1 shown in FIG. 2. The storage medium M1 is, for example, a compact disc (CD) or a digital versatile disc (DVD). In the storage medium M1, an installer 110 and the operation management software 120 have been stored. The installer 110 is a program for installing the operation management software 120. The administrator sets the storage medium M1 in the ODD 22 of his or her own computer and executes the installer 110, thereby installing the operation management software 120.

The operation management software 120 includes an encryption key table creation module 121, an installation package creation module 122, a recovery module 123, an installer 124, and hard disk encryption software 125. Of these, the hard disk encryption software 125 is a program which is installed in the individual computers of the clients and encrypts the data in the HDD 21. The administrator creates an installation package for distributing the hard disk encryption software 125 to the individual clients by using the operation management software 120. Although an example of creating the installation package in the form of a storage medium M2 is explained as shown in FIG. 2, the installation package may be created in the form of a delivery file, provided that the administrator computer and the client computers can communicated with one another.

When an installation package (storage medium M2) is created by the operation management software 120, first, the encryption key table creation module 121 inputs, for example, system time as a parameter to generate random numbers, thereby creating a plurality of encryption keys. The encryption key table creation module 121 encrypts the plurality of encryption keys by using a common key shared by, for example, the administrator and the clients, and creates an encryption key table 201 which holds plaintext index information for identifying the individual encryption keys and the encrypted encryption keys in such a manner the former correspond to the latter. That is, since the administrator creates encryption keys and the clients use the keys, it may be said that the encryption program operation management system employs the off-line installation method as a method of installing the hard disk encryption software 125 in the client computers.

After the encryption key table 201 has been created, the installation package creation module 122 creates an installation package which includes the encryption key table 201, installer 124, and hard disk encryption software 125. Here, the installation package creation module 122 writes the encryption key table 201, installer 124, and hard disk encryption software 125 into the storage medium M2 set in the ODD 22.

The administrator distributes (or circulates) the installation package (or storage medium M2) created in this way to the individual clients. Having received the installation package, each client sets the storage medium M2 in the ODD 22 of his or her own computer and executes the installer 124.

The installer 124 is a program for installing the hard disk encryption software 125, and includes an encryption key selection module 1241. When installing the hard disk encryption software 125, the encryption key selection module 1241 arbitrarily selects one from a plurality of encryption keys held in the encryption key table 201. The encryption key selection module 1241 decrypts the selected encryption key once using, for example, the common key shared by the administrator and the client and then encrypts the decrypted key using, for example, an encryption key uniquely created by the client. Then, the encryption key selection module 1241 creates an encryption key file 202 including the re-encrypted encryption key and index information (plaintext) on the encryption key and stores the encryption key file 202 into the HDD 21 of the computer in which the software 125 has been installed. The hard disk encryption software 125 installed by the installer 124 encrypts the data in the HDD 21 using the encryption key included in the encryption key file 202 (for example, after the encryption key has been decrypted using the encryption key uniquely created by the client).

Figure 3:
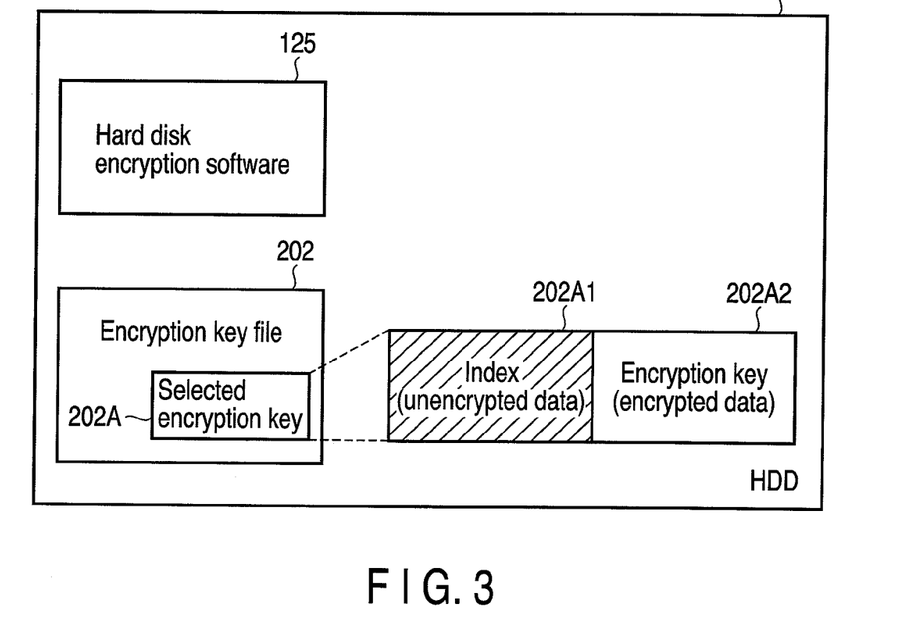
FIG. 3 is an exemplary conceptual diagram to explain a state where hard disk encryption software is installed in the encryption program operation management system of the embodiment.

FIG. 3 is an exemplary schematic diagram of the HDD 21 of the client computer after the hard disk encryption software 125 has installed by the installer 124. As shown in FIG. 3, not only has the hard disk encryption software 125 been installed, but also the encryption key file 202 including an encryption key 202A2 used to encrypt data by the hard disk encryption software 125 has been stored. The encryption key file 202 includes index information 202A1 for identifying the encryption key 202A2 in plaintext.

Figure 4:
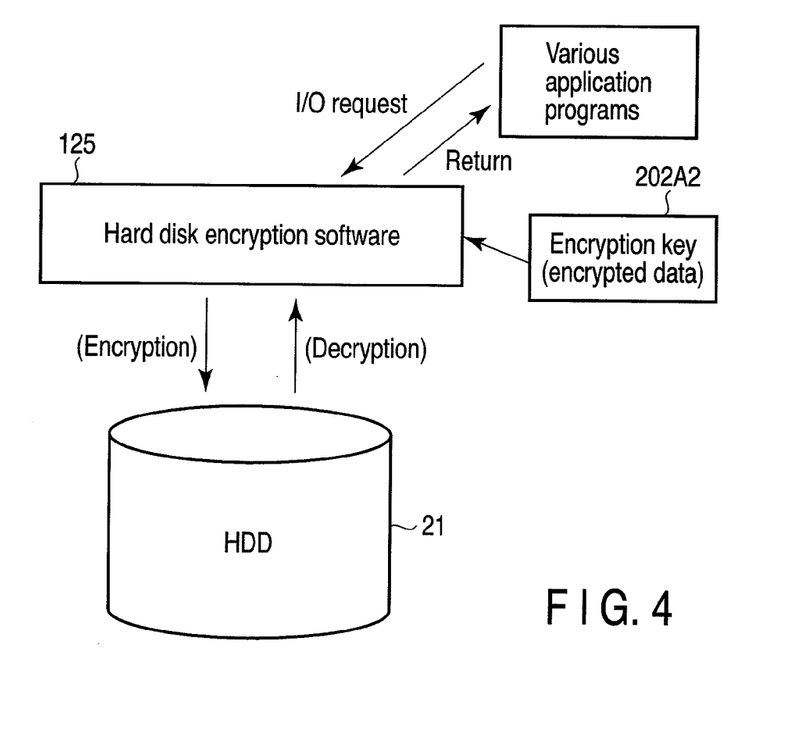
FIG. 4 is an exemplary conceptual diagram to explain the principle of a hard disk encryption process in the encryption program operation management system of the embodiment.

FIG. 4 is an exemplary conceptual diagram to explain the principle on which the hard disk encryption software 125 installed in the computer of each client encrypts the data in the HDD 21.

The hard disk encryption software 125 reads the encryption key 202A2 included in plaintext in the encryption key file 202 created by the installer 124 and decrypts the encryption key 202A2 using the encryption key, for example, uniquely created by the user. After the data to be written into the HDD 21 by each application has been encrypted using the decrypted encryption key 202A2, the decrypted data is written into the HDD 21. In addition, after the data to be read from the HDD 21 by each application has been read from the HDD 21 and decrypted, the decrypted data is handed over.

As described above, the encryption program operation management system uses the off-line installation method as a method of installing hard disk encryption software 125 into the client computer. That is, the encryption key created beforehand on the administrator side is used by each client. Although, since the installer 124 selects any one of the plurality of encryption keys at each client who installs the hard disk encryption software 125 using the distributed installation package, the encryption keys differ between clients who have installed the hard disk encryption software 125 using the same installation package. Therefore, the security strength is increased.

Next, consider a case where the computer of a client has malfunction, for example, cannot activate the operating system. To deal with this malfunction, an encryption key for decrypting the encrypted data is needed when the data in the HDD 21 is read. The encryption key is, of course, encrypted using, for example, the encryption key uniquely created by each client in the HDD 21 to be recovered.

Since in the normal off-line installation method, only one encryption key is created for each installation package, the only one encryption key has only to be obtained. As described above, in the encryption program operation management system, a plurality of encryption keys are created for each installation package and any one of the encryption keys is selected arbitrarily for each client to increase security strength. Therefore, it is necessary to determine by any method which one of the encryption keys has been used.

To do this, the encryption key table creation module 121 creates the encryption key table 201 which holds plaintext index information and an encryption key for ciphertext in such a manner that the former is caused to correspond to the latter. Similarly, the installer 124 also creates an encryption key file 202 which holds plaintext index information and an encryption key for ciphertext in such a manner that the former and the latter make pairs. That is, in the HDD 21 to be recovered, index information for recognizing the encryption key used by the hard disk encryption software 125 has been stored in plaintext.

Figure 5:
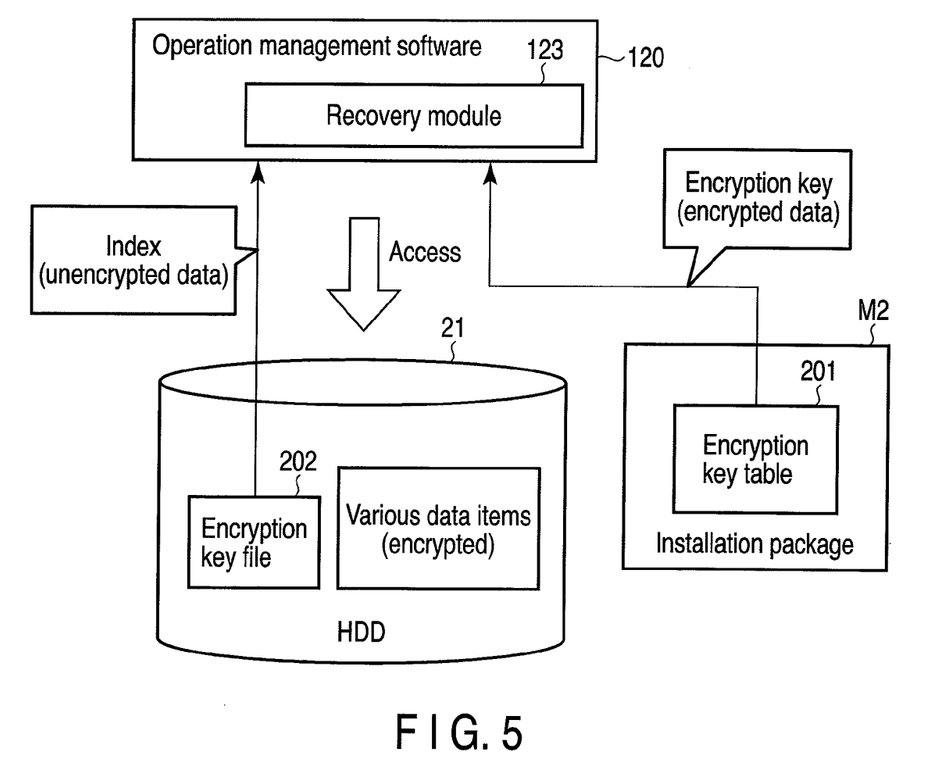
FIG. 5 is an exemplary conceptual diagram to explain the principle of a hard disk recovery process in the encryption program operation management system of the embodiment.

Therefore, as shown in FIG. 5, the recovery module 123 of the operation management software 120 installed in the administrator computer acquires plaintext index information from the encryption key file 202 stored in the HDD 21 to be recovered and then obtains the encryption key caused to correspond to the index information from the encryption key table 201 in the installation package M2. Since the encryption key has been encrypted, the recovery module 123 decrypts the key using, for example, the common key shared by the administrator and clients and, using the decrypted encryption key, decrypts various items of encrypted data in the HDD 21.

As described above, in parallel with the increase of security strength by making the encryption keys differ between the clients who have installed the hard disk encryption software 125 using the same installation package, the encryption program operation management system has a mechanism for holding plaintext index information for recognizing each of the encryption keys and encrypted encryption keys in such a manner that the former are caused to correspond to the latter, which enables the administrator to carry out a recovery process without any problem.

Figure 6:
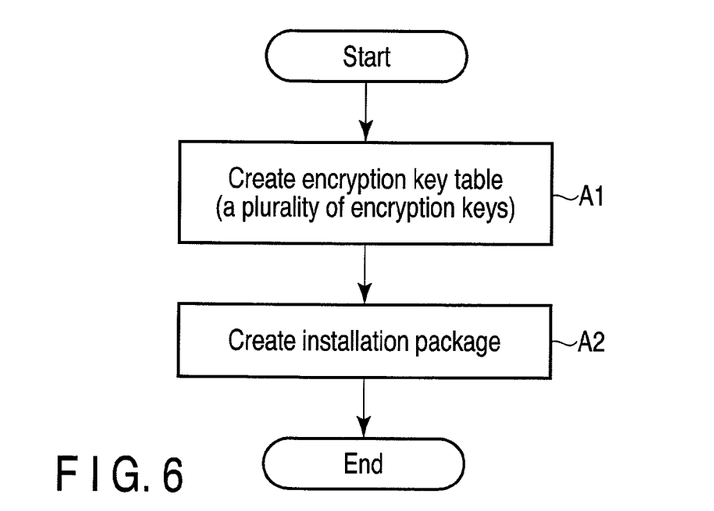
FIG. 6 is an exemplary flowchart showing the procedure for creating an installation package for operation management software running on the management-side computer in the encryption program operation management system of the embodiment.

FIG. 6 is an exemplary flowchart showing the procedure for creating an installation package for operation management software 120 running on the administrator computer.

First, the encryption key creation module 121 creates a plurality of encryption keys, encrypts the plurality of encryption keys and creates an encryption key table 201 which holds a plurality of items of plaintext index information for recognizing each of the plurality of encryption keys and a plurality of encrypted encryption keys in such a manner that the former are caused to correspond to the latter (block A1).

Next, the installation package creation module 122 creates an installation package (or storage medium M2) which includes the encryption key table 201 created by the encryption key table creation module 121, installer 124, and hard disk encryption software 125 (block A2).

Figure 7:
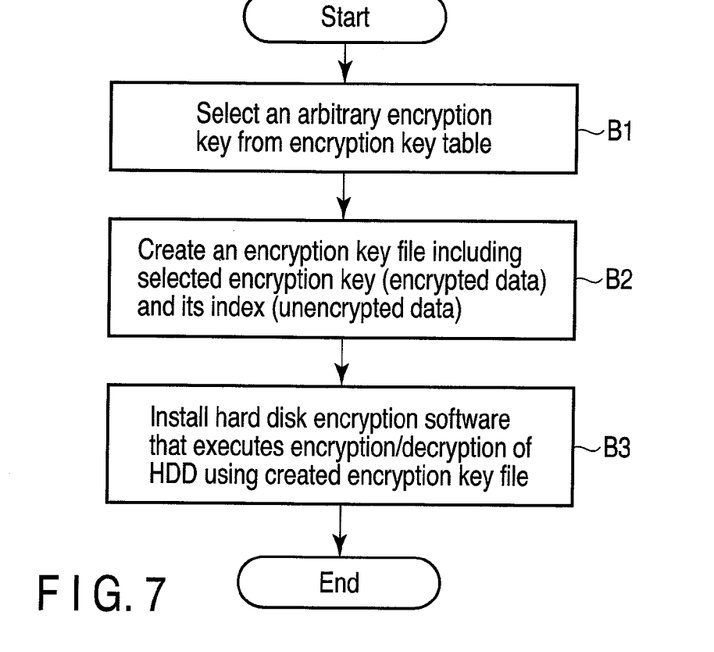
FIG. 7 is an exemplary flowchart showing the procedure for operating an installer in a case where hard disk encryption software is installed in the client-side computer in the encryption program operation management system of the embodiment.

FIG. 7 is an exemplary flowchart showing the procedure for operating the installer 124 in a case where hard disk encryption software 125 is installed in the client computer.

The encryption key selection module 1241 selects an arbitrary one of the plurality of encryption keys included in the encryption key table 201 in the installation package (block B1). The encryption key selection module 1241 creates an encryption key file 202 which includes the selected encryption key (ciphertext) and index information (plaintext) for recognizing the encryption key, and stores the file in the HDD 21 of the computer in which the table 201 has been installed (block B2).

Then, the installer 124 stores into the HDD 21 of the computer the hard disk encryption software 125 for encrypting the data in the HDD 21 using the encryption key included in the encryption key file 202 (block B3).

Figure 8:
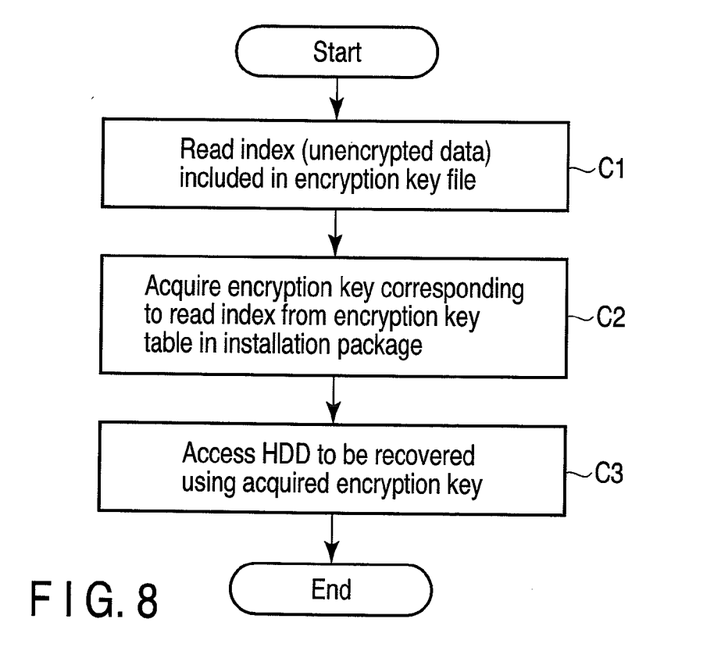
FIG. 8 is an exemplary flowchart showing the procedure for operating the operation management software in a case where the management-side computer is used to carry out the process of recovering the client hard disk in the encryption program operation management system of the embodiment.

FIG. 8 is an exemplary flowchart showing the procedure for operating the operation management software 120 in a case where the administrator computer is used to carry out a recovery process of reading the data stored in the HDD 21 of the client computer in which some defect occurred.

The recovery module 123 reads plaintext index information from the encryption key file 202 stored in the HDD 21 to be recovered (block C1). Next, the recovery module 123 reads the encryption key caused to correspond to the index information from the encryption key table 210 in the installation package (block C2). Then, the recovery module 123 reads various items of data from the HDD 21 using the read encryption key (block C3).

As described above, with the encryption program operation management system of the embodiment, security strength is increased in a case where the encryption program is distributed by the off-line installation method.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An encryption program operation management system comprising:

a processing device configured to implement an encryption key table generator, the encryption key table generator configured to generate encryption keys and to generate an encryption key table comprising encrypted versions of the encryption keys and items of plain-text index information, the encrypted versions of the encryption keys being associated with the items of index information, the encryption key table generator being configured to encrypt the generated encryption keys by using a first encryption key shared by an administrator managing an encryption program and a client using a computer upon which the encryption program is to be installed, wherein the processing device is further configured to implement an installation package generator configured to generate an installation package for distribution, the installation package comprising the encryption program, the encryption key table, and an installation program configured to cause the computer to install the encryption program on the computer;

wherein the installation program is configured to cause the computer to select one of the encrypted versions of encryption keys in the encryption key table contained in the installation package used by the encryption program, and to generate and store an encryption key file comprising the selected one of the encrypted versions of encryption keys and one of the items of index information associated with the selected one of the encrypted versions of encryption keys when the installation program installs the encryption program on the computer, the installation program being configured to decrypt the selected one of the encrypted versions of encryption keys by using the first encryption key at the time of retrieving it from the encryption key table and to re-encrypt the selected one of the encrypted versions of encryption keys by using a second encryption key at the time of storing it in the encryption key file, the second encryption key being uniquely created by the client, the encryption key file being used for determination of the selected one of the encrypted versions of encryption keys, which is encrypted by using the second encryption key uniquely created by the client, by the administrator.

2. The system of claim 1, wherein the encryption program is configured to cause the computer to:
   obtain an encryption key to be used for writing data to a hard disk and reading data from the hard disk, by decrypting the selected one of the encrypted versions of encryption keys in the encryption key file by using the second encryption key;
   encrypt target data using the obtained encryption key and write the encrypted data into the hard disk; and
   read the encrypted data from the hard disk and decrypt the encrypted data using the obtained encryption key.

3. The system of claim 2, wherein the processing device is further configured to implement a recovery module configured to read and decrypt, when the computer of the client malfunctions, the encrypted data from the hard disk of the computer of the client using a computer of the administrator comprising a drive accessible to the installation package,
   wherein the recovery module is configured to access the index information from the encryption key file in the hard disk of the computer of the client, and to read one of the encrypted versions of the encryption keys that is used by the encryption program incorporated in the computer of the client based on the read index information accessed from the encryption key table contained in the installation package set in the drive, the recovery module being configured to obtain an encryption key for decrypting the encrypted data read from the hard disk of the computer of the client, by decrypting the read one of the encrypted versions of the encryption keys by using the first encryption key.

4. A computer-readable non-transitory storage medium comprising a program configured to cause a computer of an administrator that manages an encryption program that is to be distributed and installed to:
   generate encryption keys and an encryption key table comprising encrypted versions of the encryption keys and items of plain-text index information, such that the encrypted versions of the encryption keys are associated with the items of index information, the generated encryption keys being encrypted by using a first encryption key shared by the administrator and a client using a computer upon which the encryption program is to be installed; and
   generate an installation package for distribution, the installation package comprising the encryption program, the encryption key table, and an installation program configured to cause the computer of the client to install the encryption program on the computer of the client,
   wherein the installation program is configured to cause the computer of the client to select one of the encrypted versions of encryption keys in the encryption key table contained in the installation package used by the encryption program, and to generate and store an encryption key file comprising the selected one of the encrypted versions of encryption keys and one of the items of index information associated with the selected one of the encrypted versions of encryption keys, when the installation program installs the encryption program on the computer of the client, the installation program being configured to decrypt the selected one of the encrypted versions of encryption keys by using the first encryption key at the time of retrieving it from the encryption key table and to re-encrypt the selected one of the encrypted versions of encryption keys by using a second encryption key at the time of storing it in the encryption key file, the second encryption key being uniquely created by the client.

5. The computer-readable non-transitory storage medium of claim 4, wherein the encryption program is configured to cause the computer of the client to:
   obtain an encryption key to be used for writing data to a hard disk and reading data from the hard disk, by decrypting the selected one of the encrypted versions of encryption keys in the encryption key file by using the second encryption key;
   encrypt target data by using the obtained encryption key and write the encrypted data into the hard disk; and
   read the encrypted data from the hard disk and decrypt the encrypted data by using the obtained encryption key.

6. The computer-readable non-transitory storage medium of claim 5, wherein the program is further configured to cause the computer of the administrator to read and decrypt, when the computer of the client malfunctions, the encrypted data from the hard disk of the computer of the client as a recovery module, the computer of the administrator comprising a drive accessible to the installation package,
   wherein the recovery module is configured to access the index information from the encryption key file in the hard disk of the computer of the client, and to read one of the encrypted versions of the encryption keys that is used by the encryption program incorporated in the computer of the client based on the read index information from the encryption key table contained in the installation package set in the drive, the recovery module being configured to obtain an encryption key for decrypting the encrypted data read from the hard disk of the computer of the client, by decrypting the read one of the encrypted versions of the encryption keys by using the first encryption key.

* * * * *